(12) United States Patent
Chen et al.

(10) Patent No.: US 8,749,500 B2
(45) Date of Patent: Jun. 10, 2014

(54) TOUCH DISPLAY

(75) Inventors: Chun-Hsi Chen, Miao-Li County (TW); Chien-Chih Huang, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 973 days.

(21) Appl. No.: 12/845,831

(22) Filed: Jul. 29, 2010

(65) Prior Publication Data
US 2011/0037713 A1 Feb. 17, 2011

(30) Foreign Application Priority Data
Aug. 12, 2009 (TW) .............................. 98127104 A

(51) Int. Cl.
*G06F 3/041* (2006.01)
*G06F 3/044* (2006.01)
*G06F 3/045* (2006.01)

(52) U.S. Cl.
CPC ................ *G06F 3/044* (2013.01); *G06F 3/045* (2013.01); *G06F 2203/04106* (2013.01)
USPC ...................... 345/173; 178/18.05; 178/18.06

(58) Field of Classification Search
CPC G06F 3/044; G06F 3/045; G06F 2203/04106
USPC ............... 178/18.05, 18.06; 345/173
See application file for complete search history.

(56) References Cited

U.S. PATENT DOCUMENTS

| | | | | |
|---|---|---|---|---|
| 8,200,051 B2 * | 6/2012 | Khan et al. | ........................ | 385/14 |
| 2005/0110772 A1 * | 5/2005 | Kong et al. | .................... | 345/174 |
| 2008/0036959 A1 * | 2/2008 | Yang et al. | .................... | 349/155 |
| 2009/0160797 A1 * | 6/2009 | Jiang et al. | ..................... | 345/173 |
| 2010/0001977 A1 * | 1/2010 | Lin et al. | ........................ | 345/174 |
| 2010/0141411 A1 * | 6/2010 | Ahn et al. | .................. | 340/407.2 |

FOREIGN PATENT DOCUMENTS

| | | |
|---|---|---|
| TW | 591299 | 6/2004 |
| TW | 200632542 | 9/2006 |
| TW | 200813532 | 3/2008 |
| TW | 200919287 | 5/2009 |

OTHER PUBLICATIONS

Taiwanese language office action dated Jun. 28, 2013.
English language translation of abstract of TW 591299 (published Jun. 11, 2004).

(Continued)

*Primary Examiner* — Amr Awad
*Assistant Examiner* — Randal Willis
(74) *Attorney, Agent, or Firm* — McClure, Qualey & Rodack, LLP

(57) ABSTRACT

A touch display including a display panel, multiple first stripe electrodes, a substrate, multiple second stripe electrodes, and multiple spacers is provided. The display panel has a first surface, and the first stripe electrodes are disposed on the first surface. The substrate has a second surface, and the first surface faces the second surface. The second stripe electrodes are disposed on the second surface. A longitudinal direction of the first stripe electrodes is perpendicular to that of the second stripe electrodes. The spacers are disposed between the first surface of the display panel and the second surface of the substrate. Orthogonal projections of the spacers are on the display panel at locations where the first stripe electrodes are not disposed.

12 Claims, 5 Drawing Sheets

(56) References Cited

OTHER PUBLICATIONS

English language translation of abstract of TW 200632542 (published Sep. 16, 2006).

English language translation of abstract of TW 200813532 (published Mar. 16, 2003).

English language translation of abstract of TW 200919287 (published May 1, 2009).

* cited by examiner

TOUCH DISPLAY

CROSS-REFERENCE TO RELATED APPLICATION

The present application claims priority benefit to Taiwan application number 98127104, filed Aug. 12, 2009, the contents of which are incorporated herein by reference.

BACKGROUND

1. Field of the Invention

The present invention relates to a display, and more particularly, the present invention relates to a touch display.

2. Description of Related Art

FIG. 1 is a schematic diagram of a conventional touch display. Referring to FIG. 1, in the conventional touch display 1000, an adhesive layer 300 doped with spacers 310 is disposed between a display panel 100 and a substrate 200. When a user presses the substrate 200 located on the top of the touch display 1000, the substrate 200 is deformed and is deflected towards the display panel 100. If the touch display 1000 is a capacitive touch display, a capacitance thereof can be changed by changing a distance between electrode layers 400 and 500, and an external circuit can be used to measure a touch position. The spacers 310 of the adhesive layer 300 separate the electrode layers 400 and 500 used for sensing, so as to avoid a mutual contact between the electrode layers 400 and 500 to cause a short circuit.

However, since particles of the spacers 310 are doped in the adhesive layer 300, which is viscous, the spacers 310 are not evenly distributed between the display panel 100 and the substrate 200. Therefore, when a user presses the substrate 200 located on the top of the touch display 1000, the two electrode layers 400 and 500 are probably contacted, which may affect a measuring result of the external circuit.

If the touch display 1000 is a resistance touch display, when a user presses the substrate 200 located on the top of the touch display 1000, the two electrode layers 400 and 500 are mutually contacted to change a resistance, so that the external circuit can measure the touch position. However, if the spacer 310 is just located at a corresponding junction of the two electrode layers 400 and 500, the electrode layers 400 and 500 cannot be mutually contacted due to the spacer 310 when the user exerts a same external force, which may affect a measuring result of the external circuit. Therefore, the conventional touch display 1000 has poor response sensitivity.

SUMMARY

The present disclosure is directed to various embodiments of a touch display. For example, in one embodiment, among others, a touch display includes a display panel having a first surface and a plurality of first stripe electrodes disposed on the first surface. Also, the touch display includes a substrate having a second surface, and the first surface faces the second surface. The touch display further includes a plurality of second stripe electrodes disposed on the second surface, and a longitudinal direction of the first stripe electrodes is substantially perpendicular to a longitudinal direction of the second stripe electrodes. Additionally, the touch display includes a plurality of spacers disposed between the first surface of the display panel and the second surface of the substrate. Orthogonal projections of the spacers are on the display panel at locations where the first stripe electrodes are not disposed. In order to make the aforementioned and other features, embodiments, and advantages of the disclosure comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
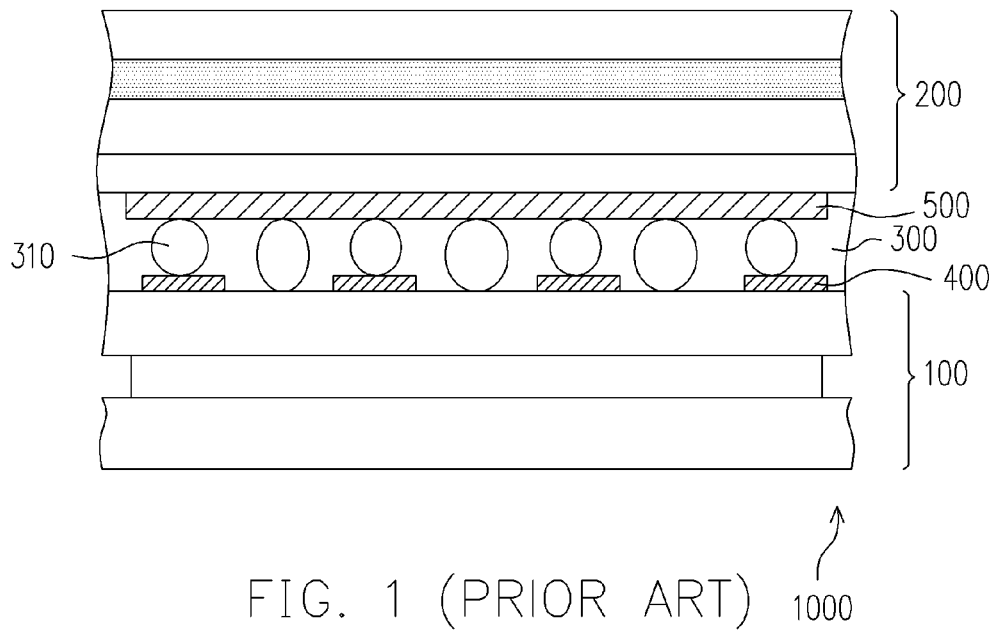
FIG. 1 is a schematic diagram of a conventional touch display.
Figure 2:
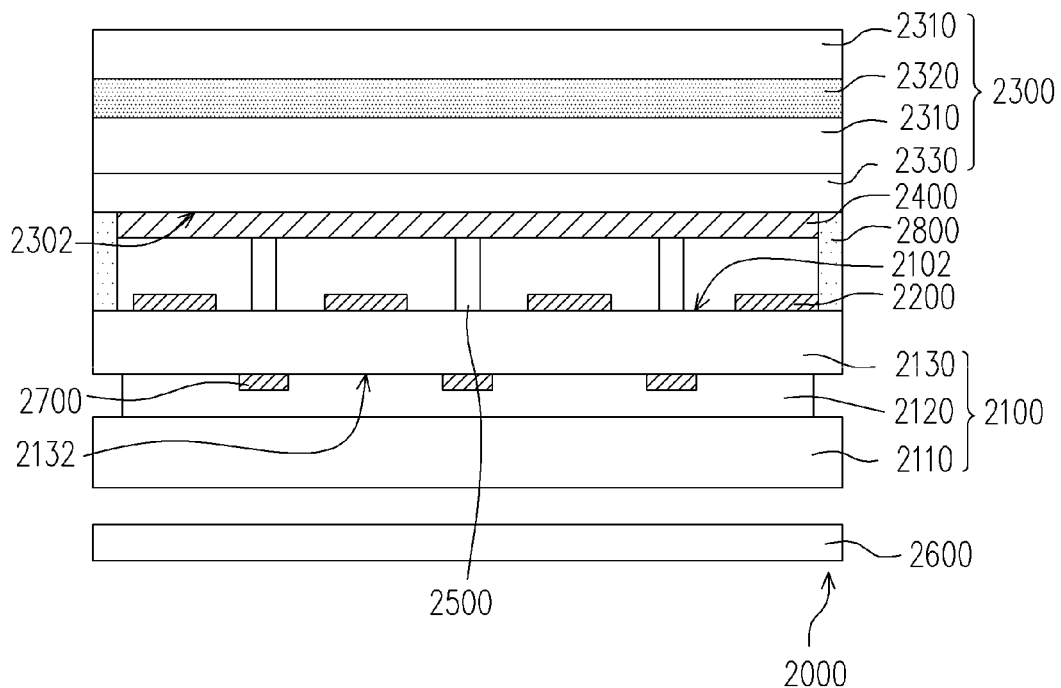
FIG. 2 is a schematic diagram of a touch display according to an embodiment of the disclosure.

FIG. 2 is a schematic diagram of a touch display according to an embodiment of the invention. Referring to FIG. 2, the touch display 2000 includes a display panel 2100, a plurality of first stripe electrodes 2200, a substrate 2300, a plurality of second stripe electrodes 2400, and a plurality of spacers 2500. The display panel 2100 has a first surface 2102, and the first stripe electrodes 2200 are disposed on the first surface 2102. The substrate 2300 has a second surface 2302, wherein the first surface 2102 faces the second surface 2302, and the second stripe electrodes 2400 are disposed on the second surface 2302. A longitudinal direction of the first stripe electrodes 2200 is substantially perpendicular to a longitudinal direction of the second stripe electrodes 2400. The spacers 2500 are disposed between the first surface 2102 of the display panel 2100 and the second surface 2302 of the substrate 2300 to provide a spacing therebetween, and orthogonal projections of the spacers 2500 are on the display panel 2100 at locations where the first stripe electrodes 2200 are not disposed. Herein, orthogonal projections are shadows of the spacers 2500 that would be formed on the first surface 2102 by projecting light which is parallel to a normal direction of the first surface 2102 to the spacers 2500.

The touch display 2000 is, for example, a resistive touch display. When a user presses the substrate 2300 at a touch position, the first stripe electrodes 2100 and the second stripe electrodes 2400 are motivated into contact, and an external circuit measures a resistance to determine coordinates of the touch position. In embodiments with the spacers 2500 evenly disposed between the display panel 2100 and the substrate 2300, deformation of the substrate 2300 is relatively even, so that the touch display 2000 has improved response sensitivity.

The display panel 2100 of the present embodiment is a liquid crystal display (LCD) panel, which includes an active device array substrate 2110, a liquid crystal layer 2120 and an opposite substrate 2130, wherein the liquid crystal layer 2120 is disposed between the active device array substrate 2110 and the opposite substrate 2130. In some embodiments, the active device array substrate 2110 is a thin-film transistor array substrate, and the opposite substrate 2130 is a color filter substrate. Since an LCD panel is not a self-luminous display panel, the touch display 2000 further includes a backlight module 2600, and the backlight module 2600 is disposed under the display panel 2100 for providing light to the display panel 2100. In the present embodiment, the display panel 2100 is a non-self-luminous LCD panel, though the disclosure is not limited thereto, and other non-self-luminous display panels, or self-luminous display panels (such as an organic light emitting diode (OLED) display panel) may also be used, consistent with the scope and spirit of the invention.

The display panel 2100 may have a black matrix 2700, and the black matrix 2700 is disposed on a surface 2132 of the opposite substrate 2130 facing the active device array substrate 2110. Particularly, the orthogonal projections of the spacers 2500 are correspondingly on the black matrix 2700 so as to reduce a chance that the light provided to the display panel 2100 by the backlight module 2600 passes through the spacers 2500. Consequently, a light utilization rate is thereby increased, and a display quality of the touch display 2000 is improved. In another embodiment that is not illustrated, the black matrix 2700 can also be disposed on the first surface 2102.

The substrate 2300 includes two three acetyl cellulose thin films 2310 and a poly vinyl alcohol (PVA) layer 2320. The PVA layer 2320 is laminated between the two three acetyl cellulose thin films 2310. However, the three acetyl cellulose thin films 2310 and the PVA layer 2320 are merely an example, and other suitable materials can also be selected to fabricate the substrate 2300.

Figure 3:
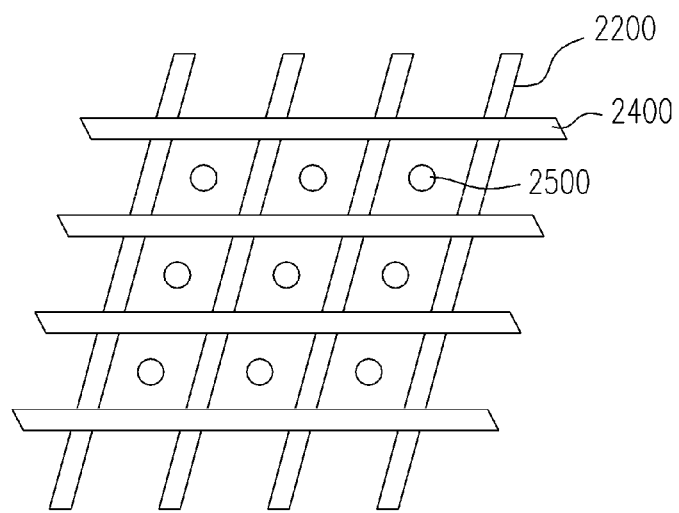
FIG. 3 is a top view of first stripe electrodes, second stripe electrodes and spacers of FIG. 2.

FIG. 3 is a top view of the first stripe electrodes, the second stripe electrodes and the spacers of FIG. 2. Referring to FIG. 3, shapes of the first stripe electrodes 2200 and the second stripe electrodes 2400 are rectangles, and the longitudinal direction of the first stripe electrodes 2200 is substantially perpendicular to that of the second stripe electrodes 2400. The spacers 2500 are disposed at areas other than junctions of the first stripe electrodes 2200 and the second stripe electrodes 2400. In the arrangement described, a density and sizes of the spacers 2500 are precisely designed so that when a user presses the touch display 2000 a force applied on a pressed area of the substrate 2300 is evenly distributed. Therefore, the substrate 2300 can be evenly deformed. Therefore, the spacers 2500 can be formed according to a printing method, so as to conveniently control the arrangement, the density and the sizes of the spacers 2500. Moreover, by controlling a height of the spacer 2500, a spacing between the substrate 2300 and the display panel 2100 can be more precisely maintained.

Figure 4:
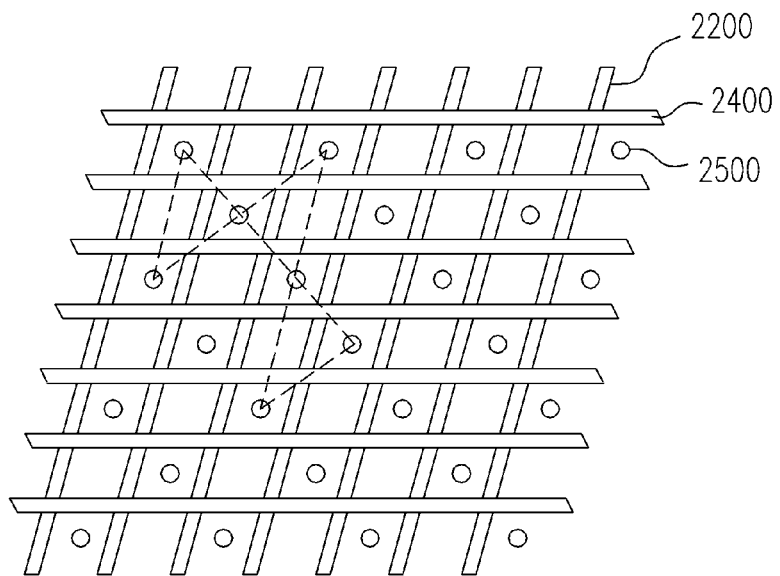
FIG. 4 is a top view of another arrangement of spacers of FIG. 3.

FIG. 4 is a top view of another arrangement of the spacers of FIG. 3. Referring to FIG. 4, the arrangement of the spacers 2500 satisfies a condition that triangles formed by any three adjacent spacers 2500 are congruent. Based on such arrangement, when the user presses the substrate 2300, the substrate 2300 can be evenly deformed due to the support provided by the spacers 2500 enabling an external circuit to more accurately measure the coordinates of the touch position. Such arrangement of the spacers 2500 is only used as an example, and those skilled in the art understand that the arrangement of the spacers 2500 may be modified.

Figure 5:
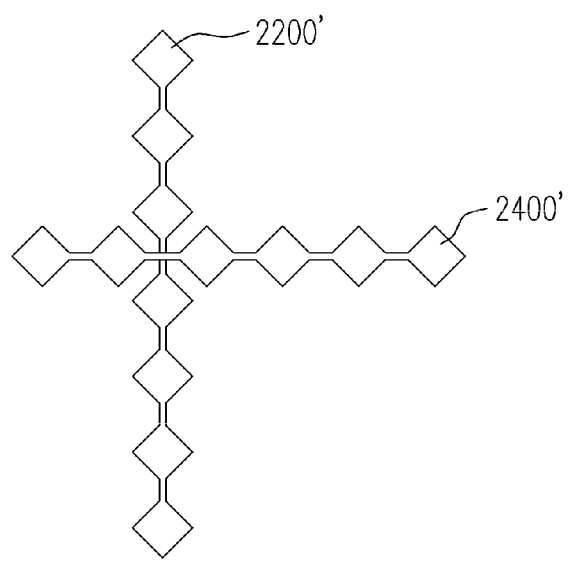
FIG. 5 is a schematic diagram illustrating shapes of a first stripe electrode and a second stripe electrode according to another embodiment of the disclosure.

FIG. 5 is a schematic diagram illustrating shapes of a first stripe electrode and a second stripe electrode according to another embodiment of the disclosure. Referring to FIG. 5, the first stripe electrode 2200' and the second stripe electrode 2400' each have a stripe shape formed by a plurality of diamond electrodes connected in series. Hence, the first stripe electrode 2200' and the second stripe electrode 2400' also each have longitudinal directions. The shapes of the first stripe electrode 2200' and the second stripe electrode 2400' may be stripe shapes formed by connecting electrodes with other shapes.

Referring to FIG. 2 again, the touch display 2000 further includes a sealant 2800, which is disposed on the substrate 2300 and the display panel 2100, and the sealant 2800 is located at a periphery of the substitute 2300 and the display panel 2100. The sealant 2800 may include a material such an ultraviolet (UV) curing adhesive or a heat curing adhesive. The sealant 2800 can be cured through UV irradiation, heat or pressure, which is determined according to the material of the sealant 2800.

Figure 6:
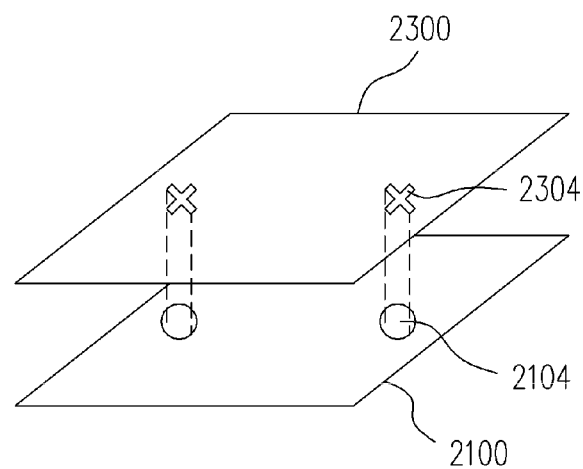
FIG. 6 is a schematic diagram illustrating a display panel and a first alignment mark thereof and a substrate and a second alignment mark thereof.

FIG. 6 is a schematic diagram illustrating a display panel and a first alignment mark thereof and a substrate and a second alignment mark thereof. Referring to FIG. 6, To accurately align and assemble the substrate 2300 and the display panel 2100, the display panel 2100 has a first alignment mark 2104, and the substrate 2300 has a second alignment mark 2304. Referring to FIG. 2 and FIG. 6, during an assembling process of the display panel 2100 and the substrate 2300, the sealant 2800 coats the first surface 2102 of the display panel 2100 or the second surface 2302 of the substrate 2300 first. The first alignment mark 2104 is aligned to the second alignment mark 2304, and then the display panel 2100, the substrate 2300 and the sealant 2800 are laminated.

Figure 7:
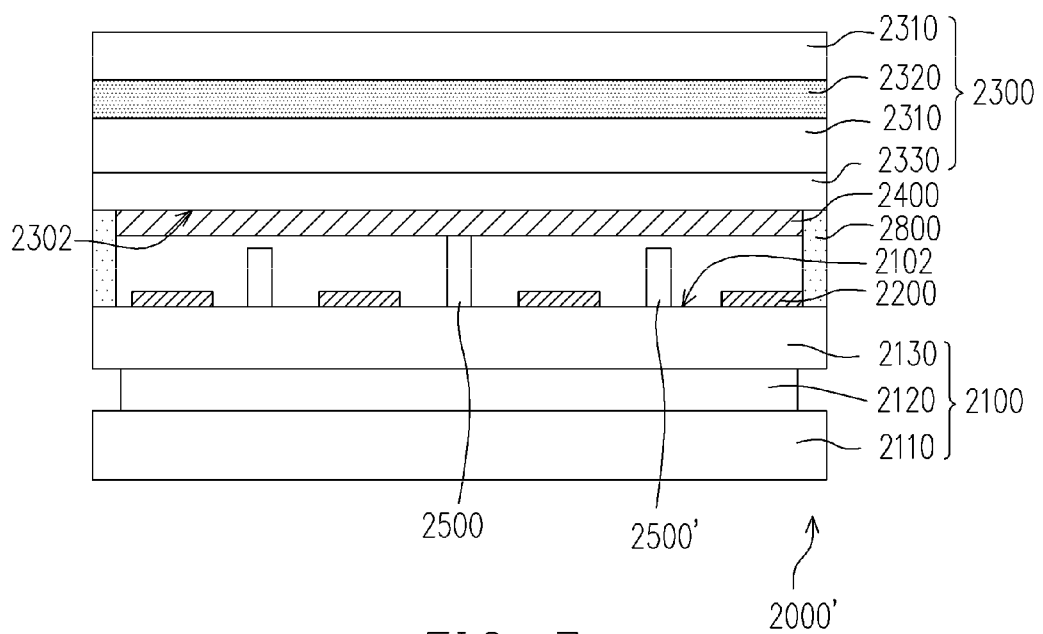
FIG. 7 is a schematic diagram illustrating an example of a height of some of the spacers is less than a height of a sealant according to another embodiment of the disclosure.

FIG. 7 is a schematic diagram illustrating an example of a height of some of spacers as being less than a height of the sealant according to another embodiment. In the touch display 2000', the height of spacers 2500' can be less than that of the sealant 2800, and the height of the spacers 2500 is the same to the height of the sealant 2800. The spacers 2500 having the height equivalent to that of the sealant 2800 can support the substrate 2300, and it is effort saving when the user presses the substrate 2300 at the locations corresponding to the spacers 2500' having the height less than that of the sealant 2800.

Referring to FIG. 2, the substrate 2300 has a flexible substrate, which is, for example, a polarizer or a polyethylene terephthalate film. Taking a polyethylene terephthalate film 2330 as an example, the polyethylene terephthalate film 2330 is disposed between the second surface 2302 of the substrate 2300 and the second stripe electrodes 2400. The substrate 2300 may be strong due to the polyethylene terephthalate film 2330, so as to avoid a deflection of the substrate 2300 in a natural disposing state that is caused by gravity, and avoid influencing the measuring result of the external circuit.

Figure 8:
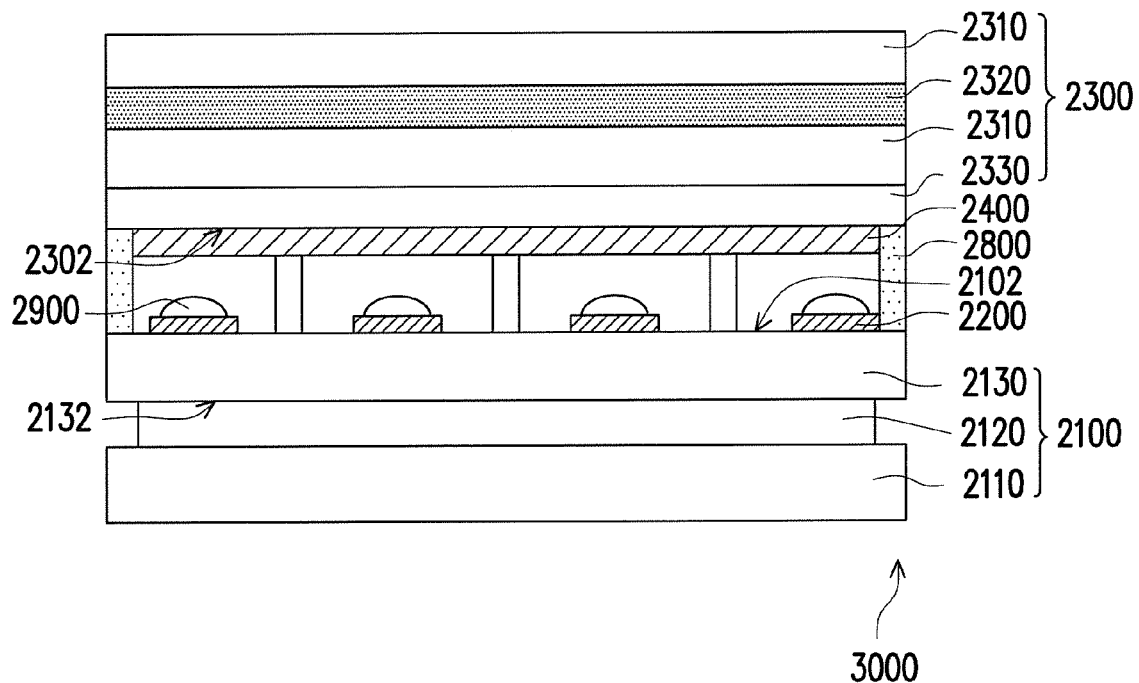
FIG. 8 is a schematic diagram illustrating a touch display according to still another embodiment of the disclosure.

FIG. 8 is a schematic diagram illustrating a touch display according to still another embodiment of the disclosure. Referring to FIG. 8, the touch display 3000 can be a capacitive touch display, which further includes a plurality of bumps 2900 compared to the aforementioned touch display 2000. The bumps 2900 are disposed on the first stripe electrodes 2200 at the junctions of the first stripe electrodes 2200 and the second stripe electrodes 2400. A total height of the bump 2900 and the first stripe electrode 2200 is less than the height of the spacer 2500 or the spacer 2500', and there is a space between the bump 2900 and the corresponding second stripe electrode 2400. When the user presses the substrate 2300, the space between the first stripe electrode 2200 and the second stripe electrode 2400 is changed, so that the capacitance between the first stripe electrode 2200 and the second stripe electrode 2400 is also changed. In other embodiments that are not illustrated, the bumps 2900 can also be disposed on the second stripe electrodes 2400 at the junctions of the first stripe electrodes 2200 and the second stripe electrodes 2400, and the bumps 2900 can face the first stripe electrodes 2200.

Figure 9:
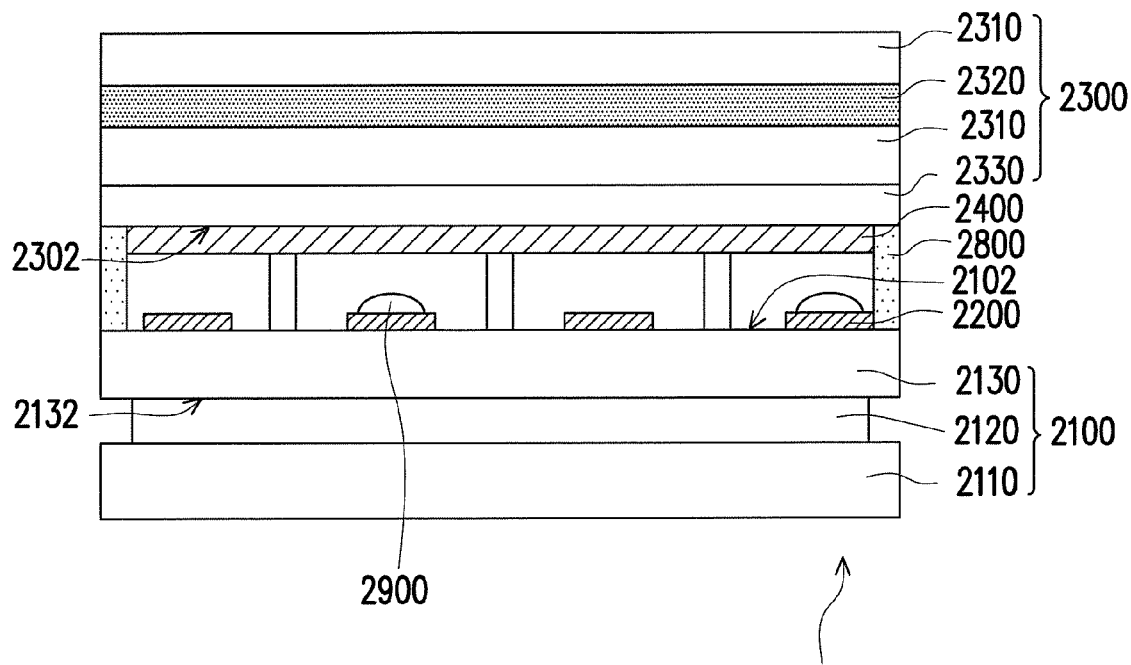
FIG. 9 is a schematic diagram illustrating a touch display according to yet another embodiment of the disclosure.

Certainly, the above resistive and capacitive measuring concepts can be integrated to deduce a resistive-capacitive touch display 4000. In other words, the bumps 2900 are disposed on the second stripe electrodes 2400 or the first stripe electrodes 2200 at the junctions of a part of the first stripe electrodes 2200 and the second stripe electrodes 2400. When the user presses the substrate 2300, the external circuit may simultaneously measure the resistance and the capacitance, so that the resistive-capacitive touch display 4000 may have a better measuring effect and response sensitivity compared to the above capacitive touch display or the resistive touch display, and a schematic diagram of the resistive-capacitive touch display 4000 is as that shown in FIG. 9.

Accordingly, various embodiments of a touch display are described above. Since the spacers are disposed between the substrate and the display panel, some embodiments of the touch display may have of the following advantages:
1. A fixed space may be maintained between the substrate and the display panel.
2. The spacers may be formed according to the printing method, enabling convenient control of the arrangement, the density and the sizes of the spacers.
3. By controlling the arrangement and the density of the spacers, the substrate may be evenly deformed after being pressed, so as to increase the response sensitivity of the touch display.
4. The capacitive and the resistive structures may be integrated, so that the external circuit may simultaneously measure the capacitance and the resistance, and therefore the touch display may have a better measuring effect and response sensitivity.

It will be apparent to those skilled in the art that various modifications and variations can be made to the structure described in the present disclosure without departing from the scope or spirit of the disclosure. In view of the foregoing, it is intended that the disclosure cover modifications and variations provided they fall within the scope of the following claims and their equivalents.

What is claimed is:

1. A touch display, comprising:
a display panel having a first surface; a plurality of first stripe electrodes disposed on the first surface; a substrate having a second surface, wherein the first surface faces the second surface;
a plurality of second stripe electrodes disposed on the second surface, wherein a longitudinal direction of the first stripe electrodes is substantially perpendicular to that of the second stripe electrodes;
a plurality of spacers disposed between the first surface of the display panel and the second surface of the substrate, such that orthogonal projections of the spacers are on the display panel at locations where the first stripe electrodes are not disposed; and
a plurality of bumps disposed on at least one of the first stripe electrodes and the second stripe electrodes at some but not all junctions of at least a part of the first stripe electrodes and the second stripe electrodes, and the bumps and the corresponding second stripe electrode or the first stripe electrode are each separated by a space.

2. The touch display as claimed in claim 1, wherein the display panel has a black matrix, and the orthogonal projections of the spacers are correspondingly on the black matrix.

3. The touch display as claimed in claim 1, wherein the spacers are disposed at areas other than junctions of the first stripe electrodes and the second stripe electrodes.

4. The touch display as claimed in claim 1, wherein triangles formed by any three adjacent spacers of the spacers are congruent.

5. The touch display as claimed in claim 1, wherein the first stripe electrodes or the second stripe electrodes are formed by a plurality of diamond electrodes connected in series.

6. The touch display as claimed in claim 1, further comprising a sealant disposed between the display panel and the substrate.

7. The touch display as claimed in claim 6, wherein a height of some of the spacers is less than a height of the sealant.

8. The touch display as claimed in claim 1, wherein the display panel further comprises a first alignment mark, and the substrate further comprises a second alignment mark, and the first alignment mark corresponds to the second alignment mark.

9. The touch display as claimed in claim 1, wherein the display panel is a liquid crystal display (LCD) panel or an organic light emitting diode (OLED) display panel.

10. The touch display as claimed in claim 1, wherein the display panel is a liquid crystal display (LCD) panel, the touch panel further comprising a backlight module disposed under the LCD panel.

11. A touch display, comprising:
a display panel having a first surface; a plurality of first stripe electrodes disposed on the first surface;
a substrate having a second surface, wherein the first surface faces the second surface and wherein the first surface and second surface are separated by a spacing;
a plurality of second stripe electrodes disposed on the second surface, wherein a longitudinal direction of the first stripe electrodes is substantially perpendicular to that of the second stripe electrodes;
a plurality of spacers are disposed to extend between the first surface of the display panel and the second surface of the substrate;
a plurality of light-restricting components disposed on the display panel on the side opposite the first surface and at locations coincident to the plurality of spacers to inhibit light from passing through the spacers; and
a plurality of bumps disposed on at least one of the first stripe electrodes and the second stripe electrodes at some but not all junctions of at least a part of the first stripe electrodes and the second stripe electrodes, and the bumps and the corresponding second stripe electrode or the first stripe electrode are each separated by a space.

12. The touch display as claimed in claim 11, wherein the plurality of light-restricting components comprise a black matrix material.

* * * * *